US011021274B1

(12) United States Patent
Judd et al.

(10) Patent No.: US 11,021,274 B1
(45) Date of Patent: Jun. 1, 2021

(54) CUBESAT SYSTEM

(71) Applicant: Triad National Security, LLC, Los Alamos, NM (US)

(72) Inventors: Stephen Judd, Los Alamos, NM (US); Nicholas Dallmann, Los Alamos, NM (US); Kevin McCabe, Santa Fe, NM (US); Donald Enemark, Los Alamos, NM (US); Michael Proicou, Los Alamos, NM (US); Daniel Seitz, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 518 days.

(21) Appl. No.: 15/259,152

(22) Filed: Sep. 8, 2016

Related U.S. Application Data (63) Continuation of application No. 15/189,041, filed on Jun. 22, 2016, now abandoned.

(60) Provisional application No. 62/182,909, filed on Jun. 22, 2015.

(51) Int. Cl.
*B64G 1/64* (2006.01)
*B64G 1/10* (2006.01)

(52) U.S. Cl.
CPC ............ *B64G 1/646* (2013.01); *B64G 1/641* (2013.01); *B64G 2001/1092* (2013.01)

(58) Field of Classification Search
CPC ........ B64G 1/1085; B64G 1/44; B64G 1/641; B64G 1/646; B64G 2001/1092
See application file for complete search history.

(56) References Cited

U.S. PATENT DOCUMENTS

| | | | | |
|---|---|---|---|---|
| 5,152,482 A | * | 10/1992 | Perkins | B64G 1/22 244/159.4 |
| 6,061,243 A | * | 5/2000 | Barnett | H01L 23/13 165/104.33 |
| 7,478,782 B2 | * | 1/2009 | Huang | B64G 1/10 244/158.1 |
| 9,231,323 B1 | * | 1/2016 | Jaeger | F16L 37/002 |
| 9,994,336 B1 | * | 6/2018 | Ghassemieh | B64G 1/00 |
| 2006/0038084 A1 | * | 2/2006 | Fussell | B64G 1/52 244/173.1 |
| 2006/0073723 A1 | * | 4/2006 | Cowgill | G01R 1/0416 439/247 |
| 2006/0185277 A1 | * | 8/2006 | Quincieu | B64G 1/10 52/265 |
| 2007/0250267 A1 | * | 10/2007 | Jaeger | H04B 7/195 701/531 |

(Continued)

*Primary Examiner* — Jessica B Wong
(74) *Attorney, Agent, or Firm* — LeonardPatel PC; Michael Aristo Leonard, II; Sheetal Suresh Patel (57) ABSTRACT

Small cubesat systems may be available for a lower cost, have a higher reliability, and be much simpler to use than conventional cubesats. A complete turnkey system solution may be provided, including the ground station and remote field units. The satellite, ground station, and field unit may be provided separately as kits that are ready to go out-of-the-box as soon as they arrive. This enables universities, researchers, and hobbyists to obtain and deploy their own functional satellites. Furthermore, theoretical designs and functionality may be rapidly prototyped and demonstrated, which allows for proof-of-concept without needing to build a larger, more expensive satellite system and hope that the new design or functionality works as intended.

13 Claims, 9 Drawing Sheets

(56) References Cited

U.S. PATENT DOCUMENTS

| | | | |
|---|---|---|---|
| 2010/0218044 A1* | 8/2010 | Roblett | H04L 43/50 714/32 |
| 2011/0277620 A1* | 11/2011 | Havran | F42C 15/40 89/1.14 |
| 2012/0000575 A1* | 1/2012 | Yandle | F16L 37/35 141/98 |
| 2014/0039729 A1* | 2/2014 | Puig-Suari | B64G 1/10 701/3 |
| 2016/0109501 A1* | 4/2016 | Spark | G01R 31/67 348/374 |
| 2016/0257432 A1* | 9/2016 | Shmueli | B64G 1/1085 |

* cited by examiner

FIG. 5

CUBESAT SYSTEM

CROSS REFERENCE TO RELATED APPLICATION

This application is a continuation of, and claims priority to, U.S. patent application Ser. No. 15/189,041 filed on Jun. 22, 2016, which claims the benefit of U.S. Provisional Patent Application No. 62/182,909 filed on Jun. 22, 2015. The subject matter of these earlier filed applications is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to cubesats, and more specifically, to a small but effective cubesat system that may provide a turnkey cubesat system solution.

BACKGROUND

There are few conventional commercial cubesat options that are readily available to most potential users. At a starting price level of $20,000, a typical cubesat kit consists of a structure and extensive list of mix-and-match options for the microprocessor, power, radio, etc. However, this kit gets expensive quickly as components are added.

Furthermore, the learning curve for conventional kits is steep, the satellites are difficult to work with (e.g., to get at the boards, the satellite has to be completely disassembled, the software is nontrivial, etc.), and performance to date has been uneven, with many satellites never even making contact with a ground station. The user still has to build an entire ground station, and no field units are available for remote sensing applications. This leaves universities, researchers, and hobbyists, who tend to have more limited budgets and simpler needs, with no viable satellite option for many missions and applications. Furthermore, no commercial offerings provide a ground station or remote field units. Accordingly, an improved cubesat system may be beneficial.

SUMMARY

Certain embodiments of the present invention may provide solutions to the problems and needs in the art that have not yet been fully identified, appreciated, or solved by conventional small cubesats. For example, some embodiments of the present invention pertain to small, low cost, turnkey cubes at systems that enable users to rapidly assemble and deploy cubesats. The cubesat may include a payload/developer section that integrates with a docking station.

In an embodiment, a system includes a space vehicle kit. The space vehicle kit includes a payload/developer section configured to house a payload, a payload electrical interface board including at least one connector, and a docking station configured to connect to the payload electrical interface board via the at least one connector. The docking station facilitates testing and development of the space vehicle without requiring handling of internal space vehicle components. The system also includes a field unit kit and a ground station kit. The space vehicle kit, the field unit kit, and the ground station kit are configured to be assembled and programmed by a user.

In another embodiment, an apparatus includes a payload/developer section configured to slide into and out of a main structure of the apparatus. The apparatus also includes a user/breakout board including a processor configured to communicate with the payload/developer section.

In yet another embodiment, a docking station includes a power connector that is configured to provide power to the docking station and an interposer board including connectors for the space vehicle. The connectors allow the space vehicle to be tested from a single unit. The docking station facilitates testing and development of an assembled space vehicle without requiring handling of internal space vehicle components.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention pertain to small cubesat systems that may be available for a lower cost, have a higher reliability, and be much simpler to use than the few conventional competing units that are available. Some embodiments provide a complete turnkey system solution, including the ground station and remote field units. No existing commercial cubesat system provides these features.

Some embodiments may provide a complete turnkey solution for approximately $20,000. This enables universities, researchers, and hobbyists to obtain, program, and deploy their own functional satellites. Furthermore, theoretical designs and functionality may be rapidly prototyped and demonstrated, which allows for proof-of-concept without needing to build a larger, more expensive satellite system and hoping that the new design or functionality works as intended.

In some embodiments, the radio modem and microprocessor are on a single board with the power system. Open source software may be used, and the board may be analogous to a single board computer. The board may be integrated in a relatively simple, small cubesat structure (e.g., 1U, 1.5U, 3U, etc.) with a battery, a low gain antenna, and a relatively simple breakout board. Once the software is updated, the result is a fully functional cubesat containing power, communications, and a microprocessor that is relatively low cost, relatively easy to develop for, and relatively easy to operate. By including a ground station kit, the entire operation becomes turnkey. By including a field unit kit, the total system functionality expands considerably.

In certain embodiments, the satellite lacks an attitude determination and control system (ADCS) and a high data rate (e.g., no high gain antenna, such as a helical antenna). Furthermore, there may be no reprogrammability on-orbit, although certain embodiments have this feature. Rather, the cubesat may include only the basic components required to get it up and running. The lack of these relatively complex features further reduces cost in some embodiments.

In some embodiments, the radio operates in the unlicensed 902-928 MHz industrial, scientific, and medical (ISM) band. This band does not require a Federal Communications Commission (FCC) license inside the United States, simplifying development and testing. However, a license from the National Telecommunications and Information Administration (NTIA) may be required. Furthermore, this enables many relatively low cost commercial off-the-shelf (COTS) parts to be used (e.g., antennas, amplifiers, etc.).

The satellite, ground station, and field unit may be provided separately as kits. These kits may be out-of-the-box solutions that are ready to go as soon as they arrive. Kits keep costs low (e.g., no labor costs for assembly and test). Software may be provided as libraries (e.g., radio and telemetry code) with examples to help get the satellite up and running quickly. In addition to providing a satellite kit, a ground station kit containing a radio modem, antennas, rotor, etc., that can be networked and a field unit kit containing a radio modem that can connect to a variety of sensors may be provided. Thus, a complete system solution may be provided with target costs of $10,000-20,000 for a 1U satellite (e.g., $1,000 for the circuit board, $1,000 for the cubesat structure, and $4,000 for the solar cells), a ground station kit (e.g., $1,500 for the rotor and cable, $2,000 for the modem, and $1,000 for miscellaneous hardware), and $1,000 per field unit. Note that when manufactured in significant quantities, these costs should be considerably lower.

In certain embodiments, the satellites may be part of a self-forming mesh network. The satellites may send and receive messages to create a routing table of other satellites with which they can communicate. For instance, requests for routing information may be broadcast a request for routing information. Based on the responses to the request, the satellite may learn of other satellites with which it may communicate, both directly and indirectly using other satellites as rebroadcasting "nodes." The resulting system, in principle, may be a self-forming, worldwide ground-space mesh network that connects to the Internet.

If successful, the system should be of significant interest to universities and others wanting to experiment with cubesats, groups that want to deploy remote distributed sensors with a space segment, and higher level users, including scientists, who want a quick-and-dirty cubesat capability for testing new ideas, prototyping, etc. A desirable goal of some embodiments is to get the system into the hands of hobbyists and experimenters, and let a large user community figure out new and innovative ways to use the tools and capabilities provided by the system. System support may be provided by a web page, a mailing list, etc. The idea of some embodiments is to get a group of users going, get a wiki setup, let people ask questions, and develop an online knowledge base.

In some embodiments, three kits may be offered—a satellite kit, a ground station kit, and a field unit kit. The user may assemble and program the kits. The satellite kit may contain the circuit board, cubesat structure, solar panels, antenna, and software libraries. If appropriate, a schematic may be supplied with the kit to encourage experimentation. The user may need to buy an appropriate programmer and compiler (e.g., a Keil™ programmer and compiler). A programming cable may plug into the back side of the satellite, directly into the board, to allow the satellite to be programmed and tested while fully buttoned up (i.e., fully assembled). An external breakout board may be used to enable this functionality in some embodiments. A protective case may also be that can be used for transporting the satellite to a launch facility or a suitable entity when the user is done. The software may be provided as a set of libraries for controlling the radio and some basic system functions including, but not limited to, telemetry, reading temperature, reading sensors, etc. Example programs may be provided to demonstrate basic radio communications.

In some embodiments, the satellite kit may be configured to be connected to a docking station that facilitates testing and development of the assembled cubesat without requiring handling of internal cubesat components. This provides for easier testing and also reduces the risk that components will be damaged due to handling. The docking station may provide power and diagnostic capabilities to the cubesat.

The ground station kit may contain the radio, rotor controller assembly, antennas, and supporting hardware (e.g., a circular polarization kit, etc.). The user may be expected to assemble the equipment. Although not necessary, in some embodiments, the user may program the ground station radio, as it may be the same as the satellite radio. Different rotors could also be made available.

The field unit kit may be a piece of hardware with input/output (I/O) ports that can be programmed by the user as with the satellite and ground station radios. Support may be provided by basic documentation, software examples, and an online user and developer community. Through these features, a robust, relatively simple, low cost cubesat system may be provided that users can readily implement, deploy, and experiment with.

Figure 1A:
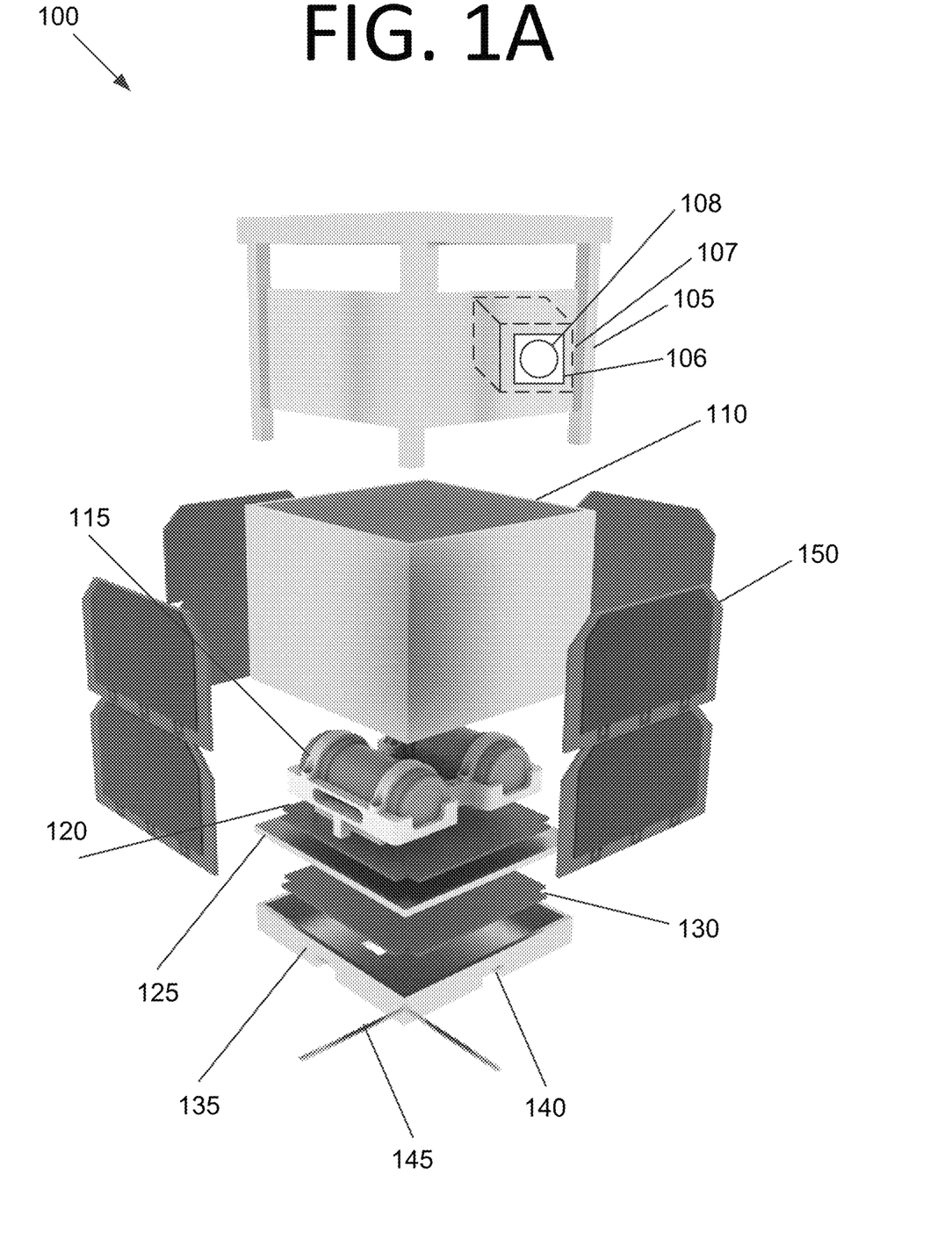
FIG. 1A is an exploded perspective view illustrating a cubesat, according to an embodiment of the present invention.

FIG. 1A is an exploded perspective view illustrating a cubesat 100, according to an embodiment of the present invention. Although cubesat 100 is shown as a 1U cubesat in this embodiment, a 1.5U cubesat, a 3U cubesat, or any other size may be provided without deviating from the scope of the invention. Cubesat 100 includes a payload/developer section 105, main walls 110, batteries 115, a user/breakout board 120, an enclosure lid 125, a radio/power board 130, a bottom plate 135, solar panel connectors 140, a radio antenna 145, and solar panels 150. The user provides a payload 107 that provides the desired functionality, such as a camera, sensors, etc. In this embodiment, payload 107 is a camera including a lens 108. In some embodiments, and ash shown in FIGS. 1A and 1B, a clear section (e.g., glass, plastic, etc.) or hole 106 may be provided so payload 107 or components thereof may have access to an unobstructed view of the outside of cubesat 100. Payload 107 may include any desired components or combination of components without deviating from the scope of the invention.

User/breakout board 120 is the payload board in this embodiment. The payload developer can do whatever he or she wants with the remaining space (e.g., add additional sensors, cameras, etc. as payload 107). As such, in some embodiments, the developer does not need to develop a new circuit board. Rather, the developer can focus on sensors, measurements, etc. For example, a developer could buy a camera and interface it to board 120, using board 120 to control the camera.

A bottom enclosure 155 when assembled (see FIG. 1B) includes bottom plate 135, radio/power board 130, enclosure lid 125, and radio antenna 145. Bottom enclosure 155 also contains separation switches (not shown) and external connectors for programming and communicating with the satellite, and may be compatible with a docking station. Generally speaking, bottom enclosure 155 contains the critical components for operation of and communications with cubesat 100 in a single package that the developer/user never touches in some embodiments. When assembled, bottom plate 135 is also the bottom portion of the structure of cubesat 100.

Radio/power board 130 may contain a low data rate radio that communicates at speeds of ones to tens of kilobits per second (kbps—e.g., 32 kbps in some embodiments), a main power system that takes power from solar panels 150, charges batteries 115, and provides power to cubesat 100, a microprocessor for managing power and communications and talking to the rest of cubesat 100 in this embodiment. The user/developer never interacts with this processor in some embodiments, which helps to ensure that cubesat 100 will be able to communicate with a ground station. In other words, in such embodiments, the user cannot accidentally change critical software or hardware and prevent proper operations.

Figure 1B:
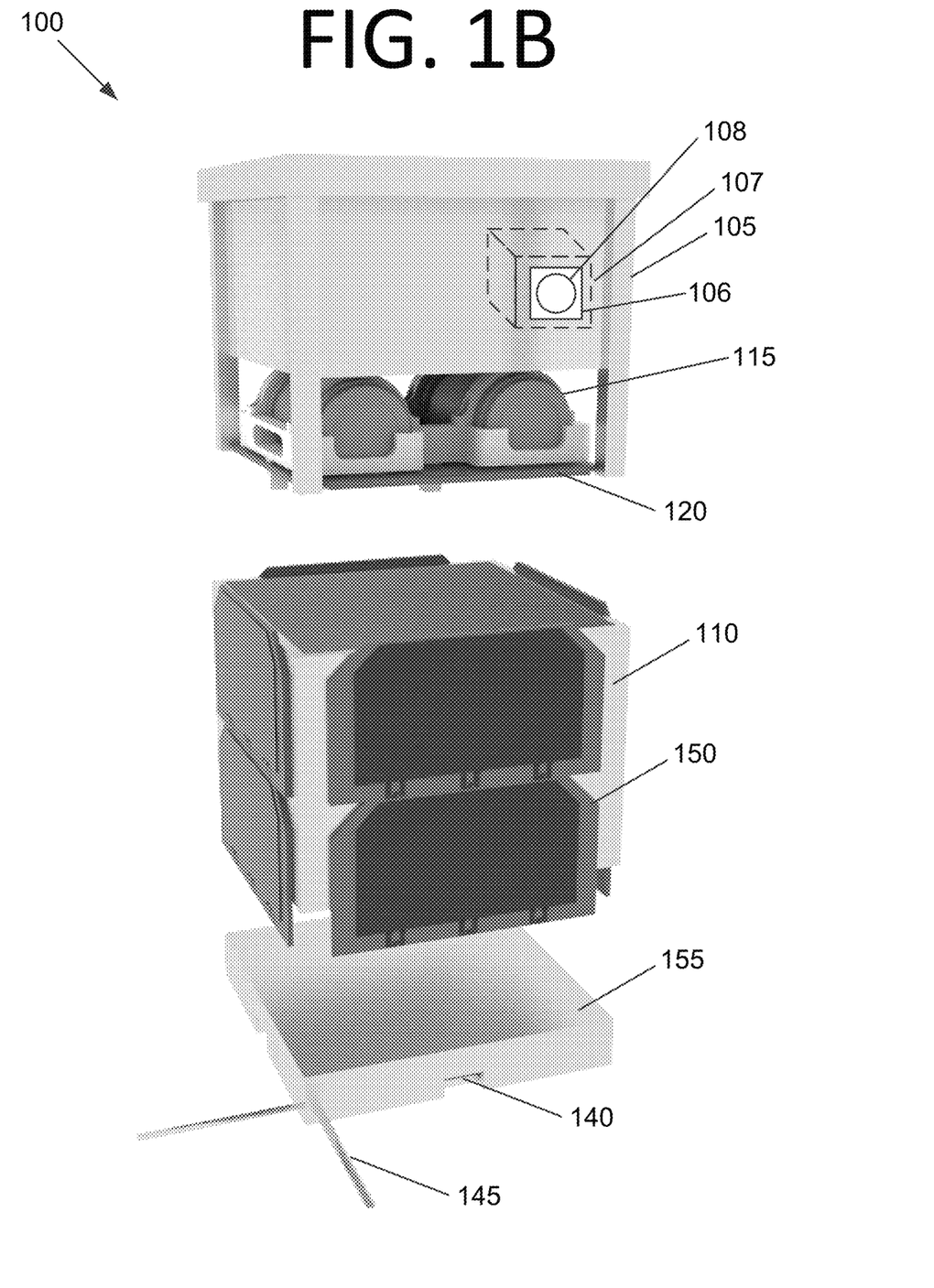
FIG. 1B is a partially assembled perspective view illustrating the cubesat, according to an embodiment of the present invention.

FIG. 1B is a partially assembled perspective view illustrating cubesat 100, according to an embodiment of the present invention. When assembled, bottom plate 155 of cubesat 100 includes a stackup of enclosure lid 125, radio/power board 130, bottom plate 135, and radio antenna 145. Main walls 110 then slip over this assembly and attach to bottom plate 135, forming a solid structure. Main walls 110 may be a hinged structure, a single simplified structure, etc. Walls 110 may be a 1U, 1.5U, 2U, 3U, etc. structure in some embodiments.

Solar panels 150 are then attached to walls 110 via screws or any other suitable attachment mechanism. Solar panels 150 plug directly into radio/power board 130 via solar panel connectors 140. This ensures that a developer cannot accidentally leave a panel disconnected before flight. If solar panels 150 are screwed into the body of cubesat 100, they are automatically connected to radio/power board 130 in this embodiment.

Solar panels 150 may be 0.5U, 1U, 1.5U, etc. up to 3U in certain embodiments. "Odd" solar panel sizes may be allowed should the user want to look out the side of cubesat 100, etc. The goal is to provide flexibility, and not lock the user into a single form factor, in many embodiments. At this point, the "bus" of cubesat 100 is a standalone unit with a large empty space that the user may use for payload development.

Payload/developer section 105 slides in and out of the main structure of cubesat 100. Batteries 115 are attached to user/breakout board 120 in this embodiment, which is then attached to payload section 105. When slid into the main structure of cubesat 100, a connector (not shown) on user/breakout board 120 is mated with bottom enclosure 155 to move power and communications between radio/power board 130 and user/breakout board 120.

User/breakout board 120 contains a processor for use by the developer that can talk to radio/power board 130. This processor also provides a means of communication with payload section 105. Placing this processor in a separate area allows the payload developer to develop his or her system more or less independent of the main satellite. This arrangement also (1) provides payload developers with a powerful processor for their needs, and (2) ensures that even if the developer makes software or hardware that does not work, main satellite (radio/power) board 130 will still be functional and able to communicate with a ground station. Payload 107 may be any suitable payload that the user wants to include in cubesat 100, including, but not limited to, a camera, sensors, etc.

Battery 115 and user/breakout board 120 are placed outside of the main enclosure to promote experimentation and allow third party developers to develop for cubesat 100. For example, a user might want to use a different battery pack, or a third party developer could develop a different breakout board with a global positioning system (GPS), a different processor, etc., providing more options for payload developers.

Figure 1C:
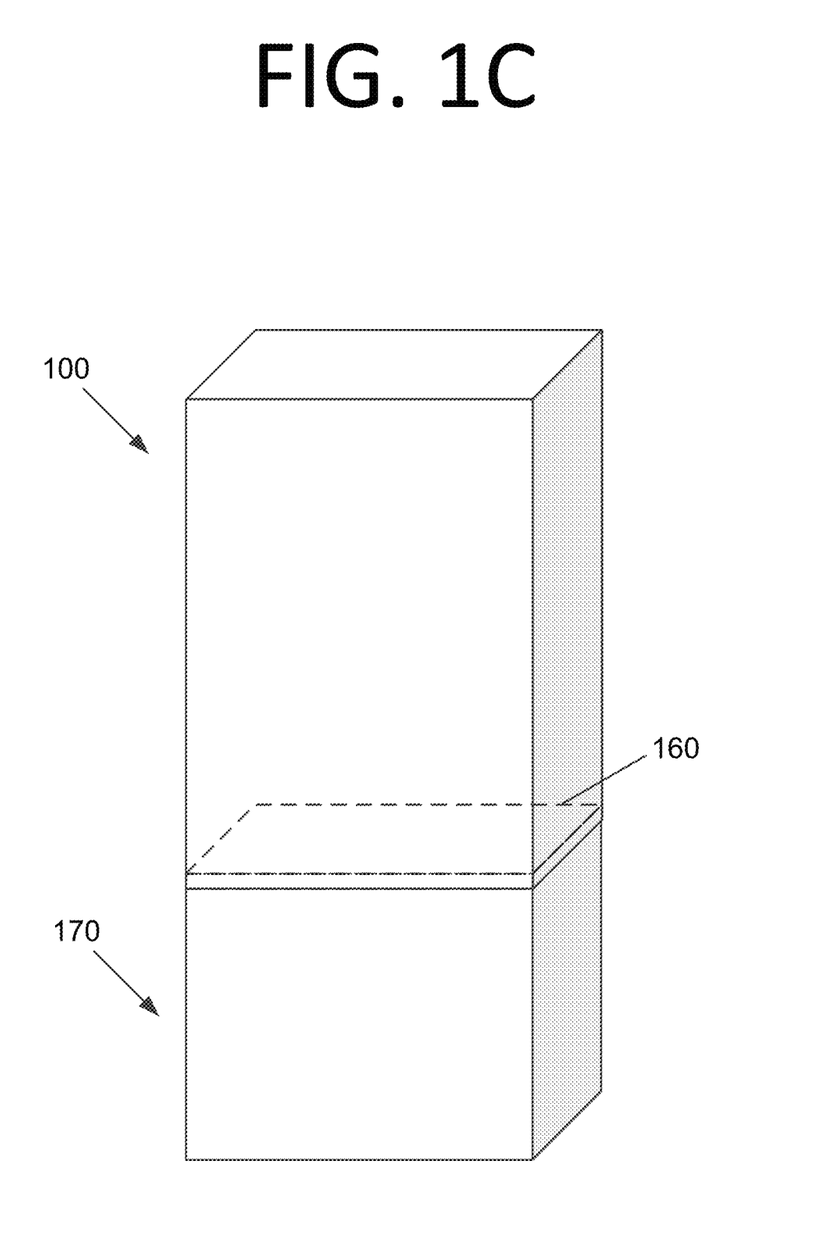
FIG. 1C is a perspective view illustrating general representations of the cubesat connected to a docking station via a payload electrical interface board, according to an embodiment of the present invention.

Once slid in, payload section 105 is attached to the main section using connectors such as screws from the top and from the sides via the notched portion of solar panels 150. The result is a very solid structure, able to withstand substantial vibrational loads, but easily assembled/disassembled via a handful of screws. Once cubesat 100 is assembled, cubesat 100 can then be attached to a docking station. FIG. 1C is a perspective view illustrating general representations of cubesat 100 connected to a docking station 170 via a payload electrical interface board 160, according to an embodiment of the present invention. In some embodiments, docking station 170 may be docking station 200 of FIGS. 2A and 2B. In some embodiments, payload electrical interface board 160 may be payload electrical interface board 340 of FIG. 3.

Figure 2A:
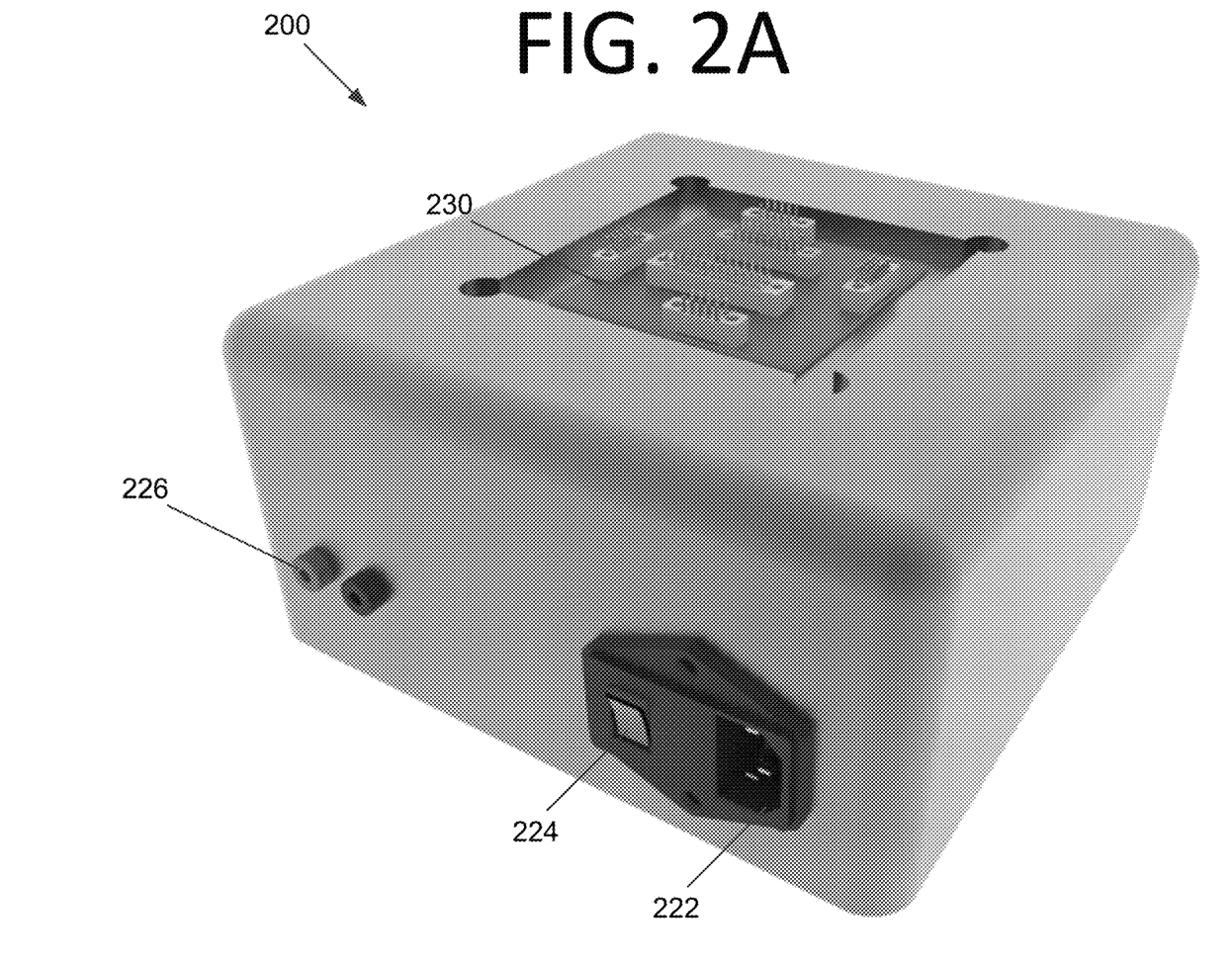
FIG. 2A is a perspective view illustrating a top and rear of a docking station, according to an embodiment of the present invention.

FIG. 2A is a perspective view illustrating a top and rear of a docking station 200, according to an embodiment of the present invention. A space vehicle may be docked to docking station 200 in either a stowed configuration or deployed configuration. The space vehicle plugs into docking station 200 via a payload electrical interface board (e.g., payload electrical interface board 340 of FIG. 3) in some embodiments. Docking station 200 then provides power and communications to the space vehicle for testing and development. Docking station 200 may be designed to be usable in thermal vacuum testing as well as benchtop testing.

A power connector 222 provides power to docking station 200 via either AC power (e.g., from a wall outlet) or DC power (e.g., from a benchtop source). A switch 224 turns power to docking station 200 on and off. Current and voltage monitors 226 provide the ability to monitor space vehicle power consumption.

An "interposer board" 230 is located on the top of docking station 220. Interposer board 230 contains connectors for the space vehicle. In some embodiments, interposer board may have connectors for each solar panel, a remove before flight connector, and a payload interface connector. These connectors may allow all aspects of the space vehicle to be tested from a single unit, including solar panels, the power system, running on internal battery power, etc. Docking station 220 may also be used to charge the satellite batteries, e.g., before integration into a cubesat dispenser, in some embodiments.

Figure 2B:
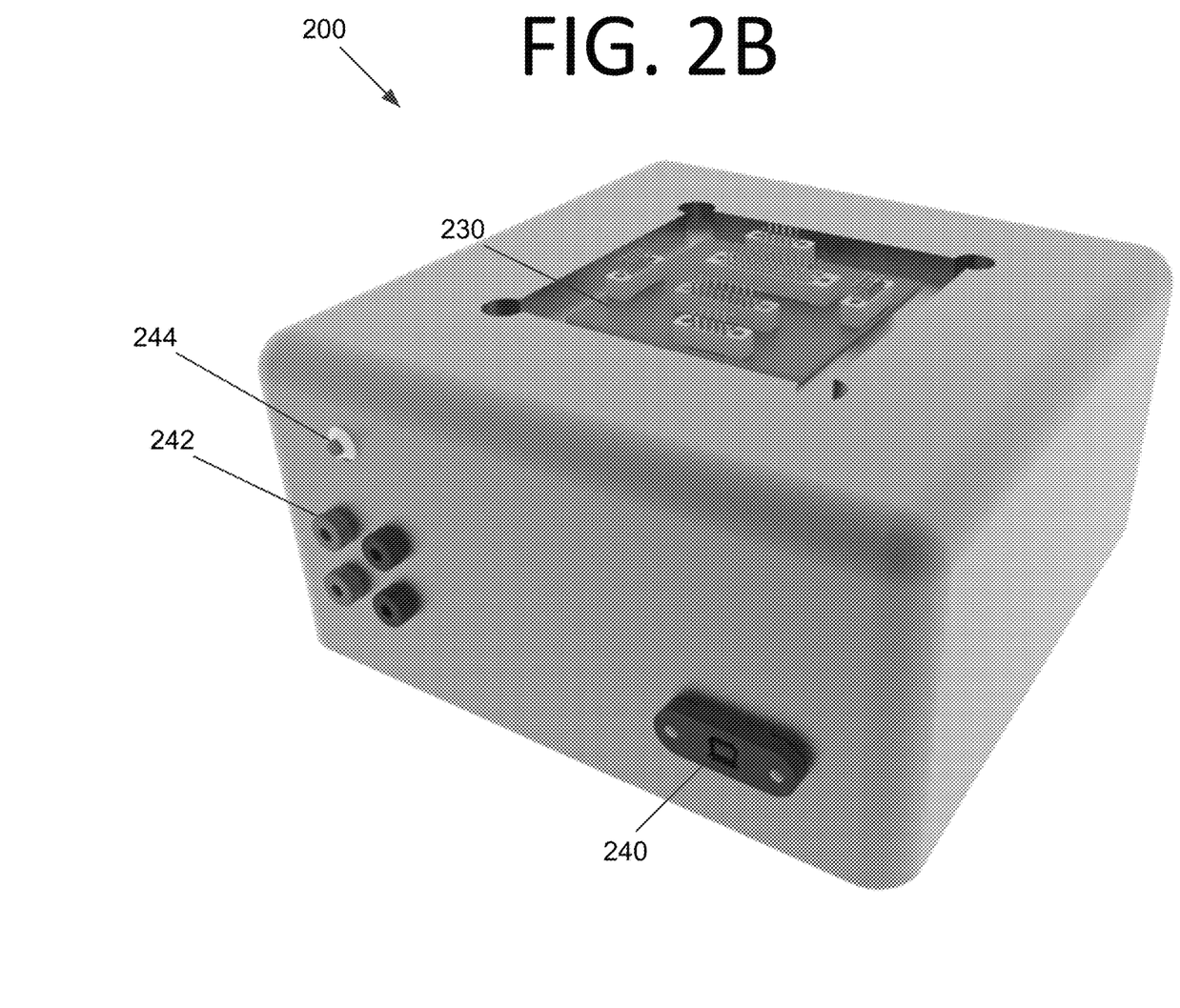
FIG. 2B is a perspective view illustrating a top and front of the docking station, according to an embodiment of the present invention.

FIG. 2B is a perspective view illustrating a top and front of docking station 200, according to an embodiment of the present invention. A USB connection 240 for serial communications with the space vehicle is included that uses a USB-to-serial converter. Current and voltage monitors 242 monitor the satellite power consumption, providing additional diagnostics for test and characterization. An indicator light 244 indicates when the docking station is powered on, and hence, whether the space vehicle is powered on or running on batteries.

Figure 3:
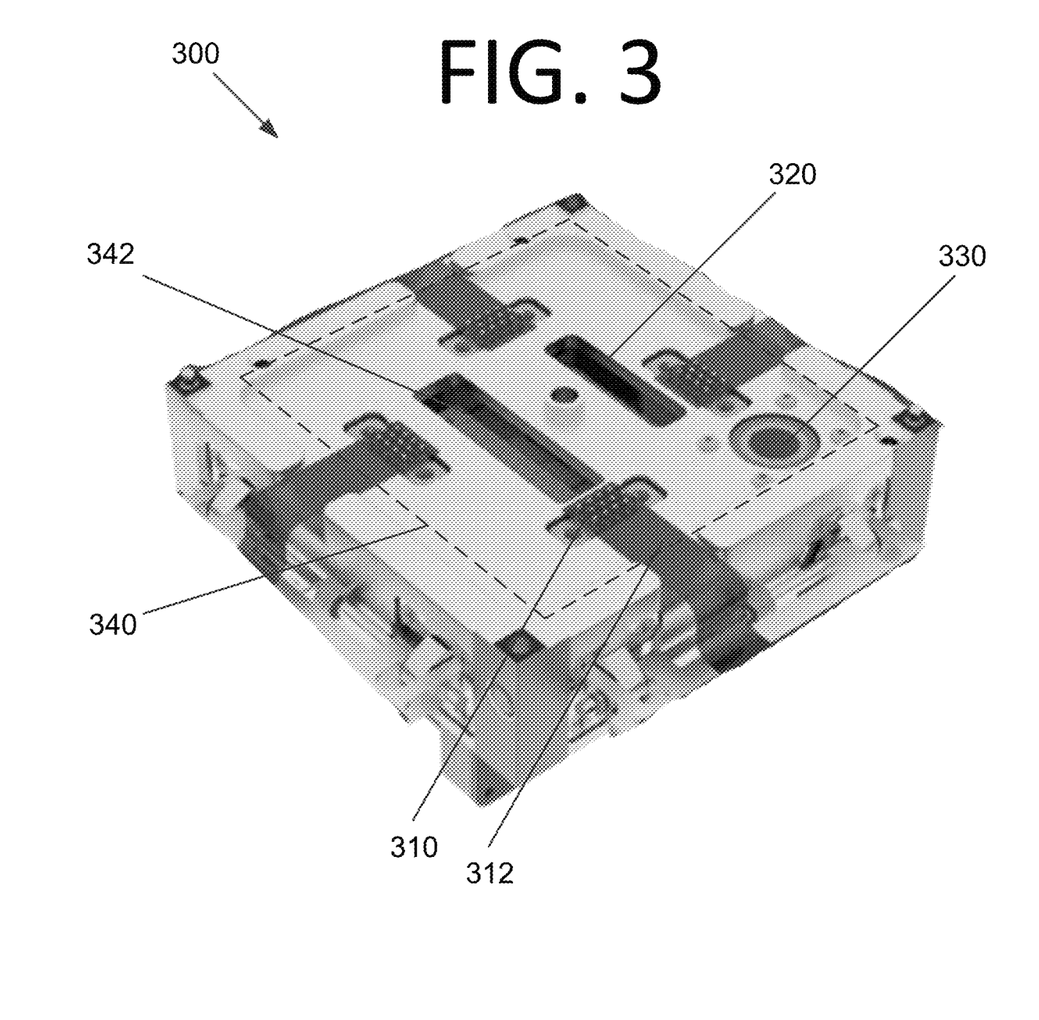
FIG. 3 is a bottom perspective view illustrating a power section interface, according to an embodiment of the present invention.

FIG. 3 is a bottom perspective view illustrating a power section interface 300, according to an embodiment of the present invention. Power section interface 300 includes solar panel connectors 310 for attaching solar panels, each connected to a respective solar panel via a flex circuit 312. Power section 300 also includes a safe arm connector 320, a sun sensor 330, and a payload electrical interface board 340 with a diagnostic/test connector 342. Connectors 310 are connected to an electrical interface board (not visible).

A docking station can interface just to diagnostic/test connector 342 in some embodiments, but for general development, by removing a mechanical interface plate (not shown), the docking station can interface to all of the connectors at the bottom of the space vehicle. This enables testing of power system interface 300, simulating solar panels, etc. While the docking station has the ability to interface with any/all of these connectors in some embodiments, in general, it may have only a single connector to interface to diagnostic/test connector 342.

Figure 4:
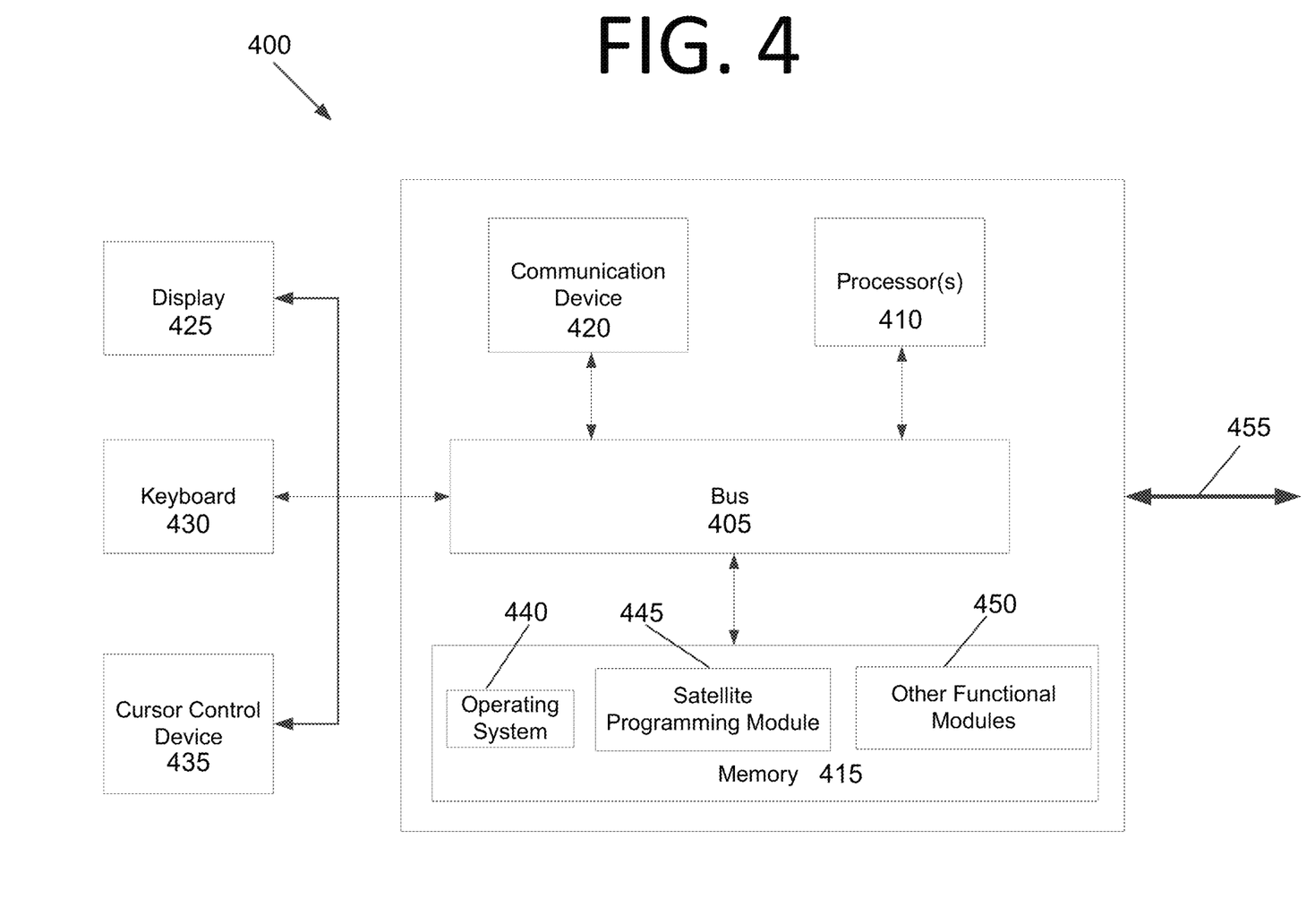
FIG. 4 is a block diagram of a computing system configured to program and test a satellite, according to an embodiment of the present invention.

FIG. 4 is a block diagram of a computing system 400 configured to program and test a satellite, according to an embodiment of the present invention. Computing system 400 includes a bus 405 or other communication mechanism for communicating information, and processor(s) 410 coupled to bus 405 for processing information. Processor(s) 410 may be any type of general or specific purpose processor, including a central processing unit ("CPU") or application specific integrated circuit ("ASIC"). Processor(s) 410 may also have multiple processing cores, and at least some of the cores may be configured to perform specific functions. Computing system 400 further includes a memory 415 for storing information and instructions to be executed by processor(s) 410. Memory 415 can be comprised of any combination of random access memory (RAM), read only memory (ROM), flash memory, cache, static storage such as a magnetic or optical disk, or any other types of non-transitory computer-readable media or combinations thereof. Additionally, computing system 400 includes a communication device 420, such as a transceiver and antenna, to wirelessly provide access to a communications network.

Non-transitory computer-readable media may be any available media that can be accessed by processor(s) 410 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 410 are further coupled via bus 405 to a display 425, such as a Liquid Crystal Display (LCD), for displaying information to a user. A keyboard 430 and a cursor control device 435, such as a computer mouse, are further coupled to bus 405 to enable a user to interface with computing system. However, in certain embodiments such as those for mobile computing implementations, a physical keyboard and mouse may not be present, and the user may interact with the device solely through display 425 and/or a touchpad (not shown). Any type and combination of input devices may be used as a matter of design choice.

Memory 415 stores software modules that provide functionality when executed by processor(s) 410. The modules include an operating system 440 for computing system 400. The modules further include a satellite programming module 445 that is configured to program and test a satellite. Computing system 400 may include one or more additional functional modules 450 that include additional functionality. A cable 455 plugs into computing system 400 on one end and a satellite or docking station (not shown) on the other end (e.g., via a user/breakout board, such a user/breakout board 120 of FIGS. 1A and 1B). Cable 455 facilitates bidirectional communication that enables computing system 400 to program and test the satellite. Cable 455 may interface with the satellite via a connector in the bottom assembly (e.g., bottom assembly 135 of FIG. 1A). Alternatively, cable 455 may interface with the satellite by removing a solar panel and using its connector.

One skilled in the art will appreciate that a "system" could be embodied as an embedded computing system, a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 5:
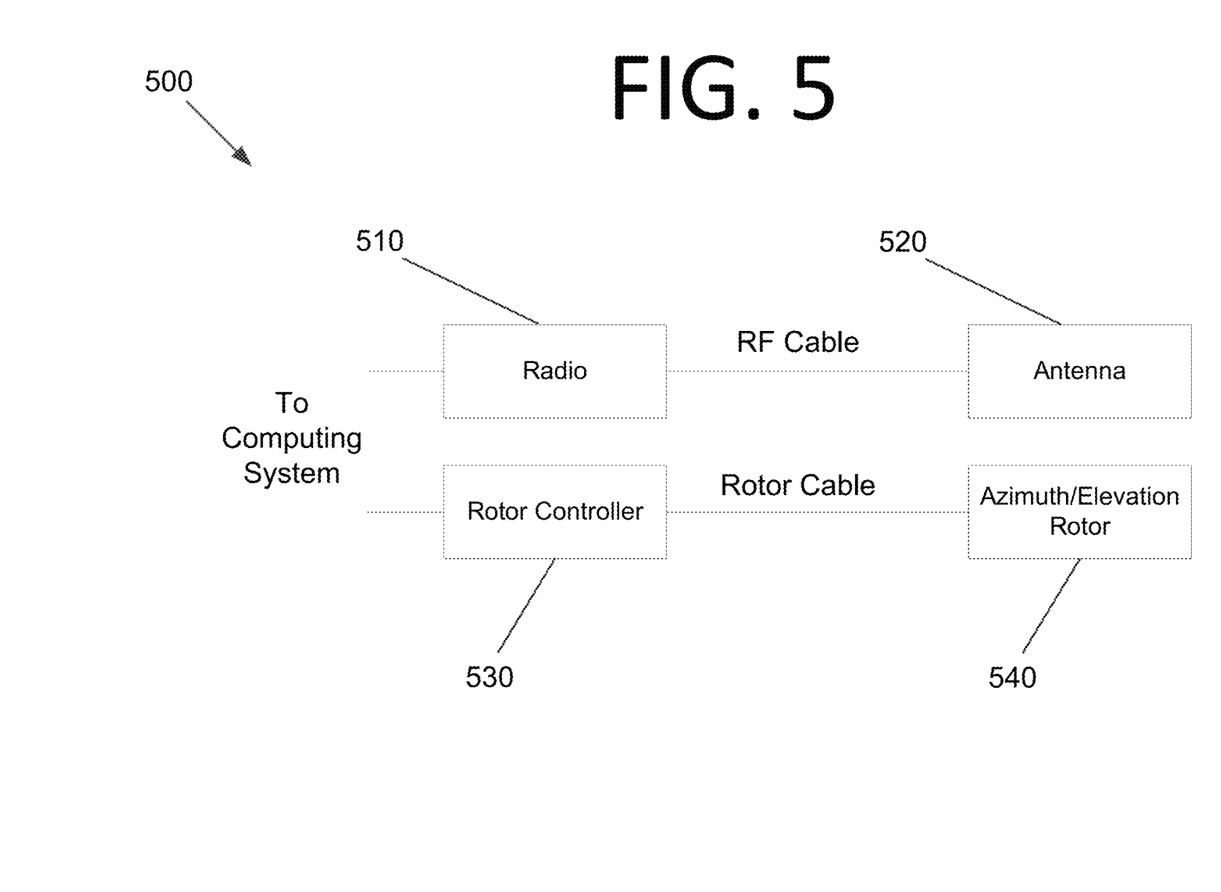
FIG. 5 is a block diagram illustrating a ground station, according to an embodiment of the present invention.

FIG. 5 is a block diagram illustrating a ground station 500, according to an embodiment of the present invention. In some embodiments, ground station 500 may come in the form of a kit, where a user can readily connect the components thereof and setup ground station 500. Ground station 500 includes a radio 510 connected to an antenna 520 via an RF cable. Ground station 500 also includes a rotor controller 530 connected to an Az/El rotor 540 via a rotor cable. Both radio 510 and rotor controller 530 are communicably connected to a computing system, such as computing system 400 of FIG. 4.

Antenna 520 is configured to facilitate two-way communication with space vehicles. Az/El Rotor 540 moves antenna 520 to facilitate better reception. Rotor controller 530 controls Az/El rotor 540, and radio 510 transmits/receives signals via antenna 520.

Figure 6:
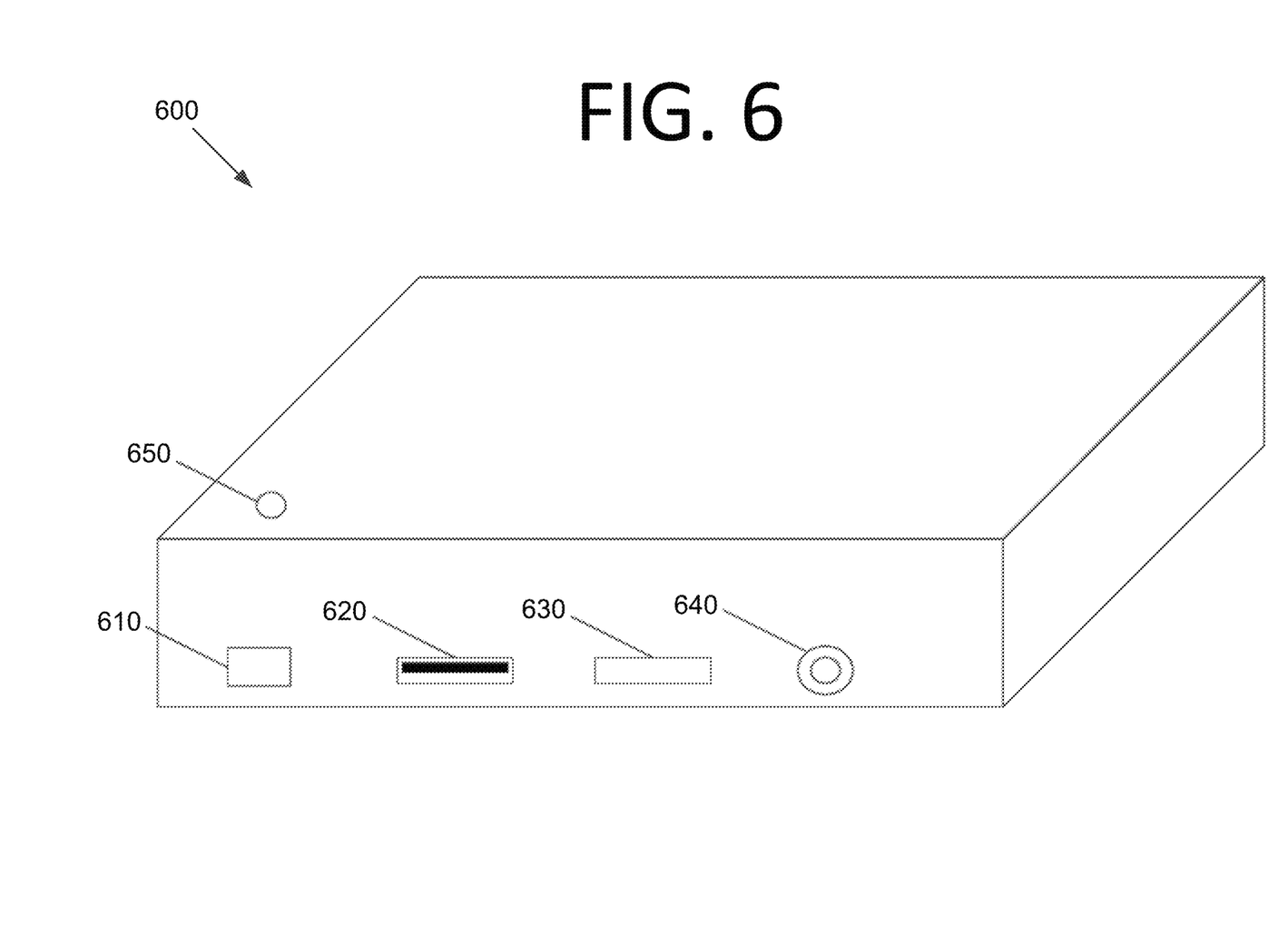
FIG. 6 is a perspective view illustrating a field unit, according to an embodiment of the present invention.

FIG. 6 is a perspective view illustrating a field unit 600, according to an embodiment of the present invention. In some embodiments, field unit 600 may come in the form of a kit, which a user can readily assemble and deploy. Field unit 600 includes a CATS port 610, a USB port 620, a general purpose input/output (GPIO) port 630, and an N-connector port 640 for receiving a radio frequency (RF) signal. A light emitting diode (LED) power indicator 650 indicates whether field unit 600 is on and has power. In some embodiments, ports 610, 620, 630, 640 constitute I/O ports that can be programmed by the user.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A system, comprising:
a space vehicle assembled from a kit, the space vehicle comprising a payload electrical interface board, a plurality of solar panels, and at least one battery, the payload electrical interface board comprising a diagnostic and test connector; and
a docking station comprising an interposer board, the docking station configured to connect to the diagnostic and test connector of the payload electrical interface board via the interposer board, the docking station configured to facilitate testing and development of the space vehicle, wherein
the docking station is configured to provide power and communications for testing and development of the space vehicle,
the space vehicle sits upon the docking station when the interposer board is connected to the diagnostic and test connector of the payload electrical interface board,
the payload electrical interface board is located on a bottom of the space vehicle proximate to the plurality of solar panels, and
the interposer board is located on a top of the docking station.

2. The system of claim 1, wherein the space vehicle comprises a space vehicle structure, an antenna, and software libraries.

3. The system of claim 1, wherein the space vehicle further comprises:
a payload section comprising a payload; and
a breakout board comprising a processor configured to communicate with the payload of the payload section.

4. The system of claim 1, wherein the docking station is configured to provide diagnostic capabilities to the space vehicle.

5. The system of claim 1, wherein the space vehicle further comprises main walls, one or more batteries, a breakout board, an enclosure lid, a radio/power board, a bottom plate, and a radio antenna.

6. The system of claim 1, wherein the docking station comprises:
a power connector configured to provide power to the docking station; and
current and voltage monitors configured to monitor space vehicle power consumption on the ground.

7. The system of claim 1, wherein the space vehicle further comprises:
a power section interface comprising a plurality of solar panel connectors, each solar panel connector connected to a respective solar panel via a flex circuit.

8. The system of claim 7, wherein the power section interface further comprises a safe arm connector and a sun sensor.

9. The system of claim 1, further comprising:
a ground station kit comprising a radio, a rotor controller assembly, one or more antennas, and supporting hardware.

10. The system of claim 1, further comprising:
a field unit comprising user programmable input/output (I/O) ports.

11. The system of claim 1, wherein the plurality of connectors of the interposer board comprise pins the payload electrical interface board comprises a plurality of corresponding sockets, the interposer board configured to directly connect to the payload electrical interface board via the corresponding pins and sockets, respectively.

12. The system of claim 1, wherein the kit comprises the plurality of solar panels, a space vehicle structure, an antenna, and software libraries.

13. The system of claim 12, wherein the software libraries comprise radio and telemetry code.

* * * * *